US012803736B2

(12) United States Patent
Gao

(10) Patent No.: US 12,803,736 B2
(45) Date of Patent: Nov. 17, 2026

(54) SOUND REFERENCE SIGNAL (SRS) TRIGGERING METHOD BASED ON DOWNLINK CONTROL INFORMATION (DCI) FOR ANTENNA SWITCHING, AND DEVICE THEREFORE

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 260 days.

(21) Appl. No.: 18/691,968

(22) PCT Filed: Sep. 15, 2021

(86) PCT No.: PCT/CN2021/118620
§ 371 (c)(1),
(2) Date: Mar. 14, 2024

(87) PCT Pub. No.: WO2023/039769
PCT Pub. Date: Mar. 23, 2023

(65) Prior Publication Data

US 2025/0132874 A1 Apr. 24, 2025

(51) Int. Cl.
*H04L 5/00* (2006.01)
*H04B 7/06* (2006.01)
*H04W 72/232* (2023.01)

(52) U.S. Cl.
CPC ......... *H04L 5/0048* (2013.01); *H04B 7/0608* (2013.01); *H04W 72/232* (2023.01)

(58) Field of Classification Search
CPC ....... H04L 5/0048; H04L 5/00; H04L 5/0094; H04B 7/0608; H04W 72/232; H04W 52/02
See application file for complete search history.

(56) References Cited

U.S. PATENT DOCUMENTS 11,153,054 B2 * 10/2021 Kim .................. H04W 52/0258
12,219,493 B2 * 2/2025 Duan .................. H04L 25/0226
(Continued)

FOREIGN PATENT DOCUMENTS

CN 110474727 A 11/2019
CN 111262679 A 6/2020
(Continued)

OTHER PUBLICATIONS

Combined Chinese Office Action and Search Report issued Feb. 28, 2026 in Chinese Patent Application No. 202180002857.5 (with English translation of Office Action only), 33 pages.
(Continued)

*Primary Examiner* — Mounir Moutaouakil
(74) *Attorney, Agent, or Firm* — Oblon, McClelland, Maier & Neustadt, L.L.P.

(57) ABSTRACT

A sounding reference signal (SRS) triggering method for antenna switching, and a device therefor. The method comprises: a network device receiving capability reporting information sent by a terminal device, where the capability reporting information is used for indicating a combination of antenna switching configurations supported by the terminal device; the network device dynamically configuring uplink SRS resources for the terminal device according to the capability reporting information; and the network device sending downlink control information (DCI) to the terminal device, where the DCI is used for triggering an SRS resource set, which corresponds to the antenna switching configuration.

16 Claims, 3 Drawing Sheets

(56) References Cited

U.S. PATENT DOCUMENTS

| | | | | |
|---|---|---|---|---|
| 12,256,236 | B2 * | 3/2025 | Liu | H04L 5/0053 |
| 12,369,152 | B2 * | 7/2025 | Cui | H04L 5/0062 |
| 12,463,770 | B2 * | 11/2025 | Chen | H04L 5/0064 |
| 12,507,158 | B2 * | 12/2025 | Shi | H04B 7/0404 |
| 12,531,609 | B2 * | 1/2026 | Go | H04B 7/061 |
| 12,537,644 | B2 * | 1/2026 | Jiang | H04L 5/005 |
| 2018/0175983 | A1 * | 6/2018 | Yum | H04L 5/0057 |
| 2020/0052837 | A1 * | 2/2020 | Zhang | H04L 5/0094 |
| 2021/0112498 | A1 * | 4/2021 | Duan | H04B 7/0817 |
| 2024/0324031 | A1 * | 9/2024 | Yuan | H04L 5/0048 |

FOREIGN PATENT DOCUMENTS

| | | | |
|---|---|---|---|
| CN | 111417199 | A | 7/2020 |
| CN | 113242061 | A | 8/2021 |
| CN | 113300823 | A | 8/2021 |
| WO | WO 2021/163938 | A1 | 8/2021 |

OTHER PUBLICATIONS

International Search Report issued Mar. 30, 2022 in PCT/CN2021/118620, filed on Sep. 15, 2021, 4 pages (with English Translation).

Motivation to introduce new R17 WI on further RRM enhancement, Media Tek Inc, 3GPP TSG-RAN WG4 Meeting #95-e, 2020, 6 pages.

* cited by examiner

SOUND REFERENCE SIGNAL (SRS) TRIGGERING METHOD BASED ON DOWNLINK CONTROL INFORMATION (DCI) FOR ANTENNA SWITCHING, AND DEVICE THEREFORE

CROSS REFERENCE TO RELATED APPLICATION(S)

The present application is a U.S. National Phase Stage application of International Application No. PCT/CN2021/118620 filed on Sep. 15, 2021, the content of which is incorporated herein by reference in its entirety for all purposes.

BACKGROUND

Technical Field

The present application relates to the field of communication technology, and in particular, relates to a sound reference signal SRS triggering method and device for antenna switching.

Description of the Related Art

In a 5th generation (5G) mobile communication system, the terminal device supports Sound Reference Signal (SRS) antenna switching, including: 1T2R; 2T4R; 1T4R, or T=R etc. According to different SRS transmission cycles, SRS may be divided into periodic transmission, semi-persistent transmission, and aperiodic transmission. SRS antenna switching is suitable for scenarios with uplink and downlink reciprocity, and is used for the network device to obtain downlink channel information. For example, in order to adapt to the current service or scenario, the terminal device may need to change the antenna configuration, such as from 2T4R to 1T4R or 2T2R, or from 2T2R to 4T4R. In this case, a different SRS resource configuration with the "antenna switching" usage needs to be used for acquiring the downlink Channel State Information (CSI).

In the SRS enhancement of the R17 version, the number of antennas will be increased to 6Rx or 8Rx. The antenna switching supports more scenarios, and the corresponding SRS configuration is more complex. The R15 or R16 version does not support flexible and dynamic antenna switching configuration within the Bandwidth Part (BWP). If a dynamic antenna switching configuration scheme is introduced, the triggering problem becomes more complicated. Therefore, it is necessary to consider related methods for SRS triggering for multiple usages including multiple antenna switching configurations.

SUMMARY

Embodiments of the present application provide a sound reference signal SRS triggering method and device for antenna switching, which may be applied in 5G NR systems and switch more flexibly and quickly or fall back to different antenna switching configurations.

In a first aspect, embodiments of the present application provide a sound reference signal SRS triggering method for antenna switching. The method is applied to a network device. The method includes receiving capability report information sent by a terminal device, where the capability report information is used for indicating the combination of antenna switching configurations supported by the terminal device, and dynamically configuring uplink SRS resources for the terminal device according to the capability report information and sending Downlink Control Information DCI to the terminal device, where the DCI is used for triggering an SRS resource set, and the SRS resource set corresponds to the antenna switching configuration.

In a second aspect, embodiments of the present application provide another sound reference signal SRS triggering method for antenna switching. The method is applied to a terminal device. The method includes sending capability report information to a network device, where the capability report information is used for indicating the combination of antenna switching configurations supported by a terminal device, and receiving downlink control information DCI, where the DCI is sent by the network device after dynamically configuring uplink SRS resources for the terminal device according to the capability report information, the DCI is used for triggering an SRS resource set, and the SRS resource set corresponds to the antenna switching configuration.

In a third aspect, embodiments of the present application provide a communication device, which has some or all of the functions of the network device for implementing the method described in the first aspect. For example, the functions of the communication device may have the functions in some or all of the embodiments of the present application, or the functions for independently implementing any embodiment in the present application. The functions described may be implemented by hardware, or may be implemented by hardware executing corresponding software. The hardware or software includes one or more units or modules corresponding to the above functions.

In an implementation, the structure of the communication device may include a transceiving module and a processing module. The processing module is configured to support the communication device to perform corresponding functions in the above method. The transceiving module is used to support communication between the communication device and other devices. The communication device may further include a storage module coupled to the transceiving module and the processing module. The storage module stores necessary computer programs and data for the communication device.

As an example, the processing module may be a processor, the transceiving module may be a transceiver or a communication interface, and the storage module may be a memory.

In a fourth aspect, embodiments of the present application provide another communication device that has some or all of the functions of the terminal device for implementing the method example described in the second aspect. For example, the functions of the communication device may have the functions in some or all of the embodiments in the present application, or the functions for independently implementing any embodiment of the present application. The functions described may be implemented by hardware, or may be implemented by hardware executing corresponding software. The hardware or software includes one or more units or modules corresponding to the above functions.

In an implementation, the structure of the communication device may include a transceiving module and a processing module. The processing module is configured to support the communication device to perform corresponding functions in the above method. The transceiving module is used to support communication between the communication device and other devices. The communication device may further include a storage module coupled to the transceiving module and the processing module. The storage module stores necessary computer programs and data for the communication device.

As an example, the processing module may be a processor, the transceiving module may be a transceiver or a communication interface, and the storage module may be a memory.

In a fifth aspect, embodiments of the present application provide a communication device. The communication device includes a processor. When the processor calls a computer program in a memory, the method described in the first aspect is performed.

In a sixth aspect, embodiments of the present application provide a communication device. The communication device includes a processor. When the processor calls a computer program in a memory, the method described in the second aspect is performed.

In a seventh aspect, embodiments of the present application provide a communication device. The communication device includes a processor and a memory. A computer program is stored in the memory. The processor executes the computer program stored in the memory, so that the communication device is caused to perform the method described in the first aspect above.

In an eighth aspect, embodiments of the present application provide a communication device. The communication device includes a processor and a memory. A computer program is stored in the memory. The processor executes the computer program stored in the memory, so that the communication device is caused to perform the method described in the second aspect above.

In a ninth aspect, embodiments of the present application provide a communication device. The communication device includes a processor and an interface circuit. The interface circuit is used to receive code instructions and transmit them to the processor. The processor is used to run the code instructions, so that the communication device is caused to perform the method described in the first aspect above.

In a tenth aspect, embodiments of the present application provide a communication device. The communication device includes a processor and an interface circuit. The interface circuit is used to receive code instructions and transmit them to the processor. The processor is used to run the code instructions, so that the device is caused to perform the method described in the second aspect above.

In an eleventh aspect, embodiments of the present application provide a communication system. The communication system includes the communication device described in the third aspect and the communication device described in the fourth aspect. Alternatively, the communication system includes the communication device described in the fifth aspect and the communication device according to the sixth aspect. Alternatively, the communication system includes the communication device according to the seventh aspect and the communication device according to the eighth aspect. Alternatively, the communication system includes the communication device according to the ninth aspect and the communication device according to the tenth aspect.

In a twelfth aspect, embodiments of the present invention provide a non-transitory computer-readable storage medium for storing instructions used by the above-mentioned terminal device. When the instructions are executed, the terminal device is caused to perform the method in the first aspect above.

In a thirteenth aspect, embodiments of the present invention provide a non-transitory computer-readable storage medium for storing instructions used by the above-mentioned network device. When the instructions are executed, the network device is caused to perform the method described in the second aspect above.

In a fourteenth aspect, the present application also provides a computer program product including a computer program, which when run on a computer causes the computer to perform the method described in the first aspect above.

In a fifteenth aspect, the present application also provides a computer program product including a computer program, which when run on a computer causes the computer to perform the method described in the second aspect above.

In a sixteenth aspect, the present application provides a computer program that, when run on a computer, causes the computer to perform the method described in the first aspect above.

In a seventeenth aspect, the present application provides a computer program that, when run on a computer, causes the computer to perform the method described in the second aspect above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
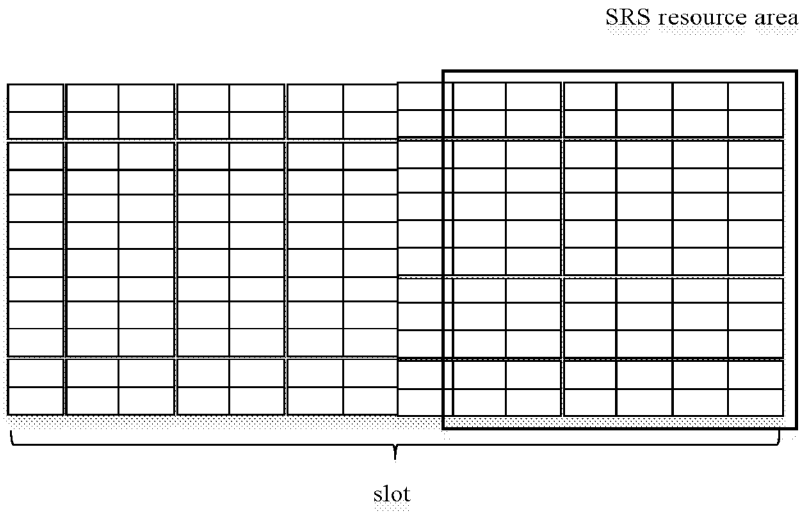
FIG. 1 is a schematic diagram of the SRS mapping area within the time slot.

Referring now to the drawings, wherein like reference numerals designate identical or corresponding parts throughout the several views.

Embodiments of the present disclosure are described in detail below, examples of which are illustrated in the accompanying drawings. The same or similar reference numerals represent the same or similar elements, or elements having the same or similar functions. The embodiments described below with reference to the accompanying drawings are exemplary and intended to explain the present disclosure, and are not to be construed as limitations of the present disclosure. In the description of the present disclosure, unless otherwise stated, "/" means or. For example, A/B may mean A or B. In the present application, "and/or" is representative of an association describing the associated objects.

It means that three relationships may exist. For example, A and/or B may mean: A exists alone, A and B exist simultaneously, and B exists alone.

In the 5G NR system, the uplink SRS may be periodic, semi-persistent, or aperiodic SRS, narrowband or wideband, single port or multi-port. Uplink SRS parameters may be configured by the network device for the terminal device, including the number of ports, frequency-domain resource locations, time-domain resource locations, sequences, sequence cycle offsets, etc. As shown in FIG. 1, in the 5G NR system, SRS is mapped on up to six symbols of an uplink time slot. For example, the network device may configure multiple uplink SRS sets for terminal devices, and one resource set contains one or more SRS resources. An SRS resource may be on N consecutive Orthogonal Frequency Division Multiplexing (OFDM) symbols, and N may occupy 1, 2, or 4 symbols.

It can be understood that the NR system supports the gNB (base station) side to obtain downlink channel information through channel reciprocity to improve downlink data transmission performance. In order to support gNB to effectively obtain downlink information through channel reciprocity with various transceiving capabilities of terminals, the NR system specially introduces the SRS reference signal. The transceiving capabilities of terminals currently defined by R15/16 may be divided into the same number of transmitting and receiving antennas (T=R) and more receiving antennas than transmitting antennas (R>T). There are mainly one transmitter and one receiver (1T1R), two transmitters and two receivers (2T2R), and four transmitters and four receivers (4T4R). There are several situations where the receiving antennas are more than the transmitting antennas: one transmitter and two receivers (1T2R), one transmitter and four receivers (1T4R), and two transmitters and four receivers (2T4R).

For different antenna configurations, the SRS resource configuration is also different. For example, several instances are given below.

1) For terminals with the same number of transmitting and receiving antennas (T=R), gNB may configure up to two SRS resource sets. In one set, there is only one SRS resource where the number of ports is equal to the number of transmitting antennas of the terminal. One of the two SRS resource sets may be configured as periodic, and the other may be configured as aperiodic.
2) For terminals with the capabilities of one transmitter and two receivers (1T2R), gNB may configure up to two SRS resource sets. In one set, there are two SRS resources where each SRS resource has only one port.
3) For terminals with the capabilities of two transmitters and four receivers (2T4R), gNB may configure up to two SRS resource sets. In one set, there are two SRS resources where each SRS resource has two ports.
4) For terminals with the capabilities of one transmitter and four receivers (1T4R), gNB requires special considerations when configuring SRS resources. For periodic or semi-persistent SRS resources, at most one resource set may be configured, of which 4 SRS resources each have 1 port. For non-Periodic SRS resources, up to 2 SRS resource sets may be configured. There are a total of 4 SRS resources in the two SRS resource sets, and these 4 resources are sent in two slots and are sent by different physical antennas. The two resource sets may be configured with 2 resources in each set, or 1 resource in one set and 3 resources in the other set, with each resource having only 1 port.

The network device (such as base station) usually configures SRS resources for the terminal based on the UE capability report of the terminal device. The UE capabilities supported by terminals of different versions will also be different. For example, the UE capabilities supported by the R15 version terminal are: t1r2, t1r4, t2r4, t1r4-t2r4, t1r1, t2r2, t4r4; and the UE capabilities supported by the R16 version terminal are: t1r1-t1r2, t1r1-t1r2-t1r4, t1r1-t1r2-t2r2-t2r4, t1r1-t1r2-t2r2-t1r4-t2r4, t1r1-t2r2, t1r1-t2r2-t4r4.

In the current research on the R17 version, considering the need to further increase the number of antennas in the terminal device, the number of antennas will be further increased to a maximum of 6 antennas or a maximum of 8 antennas. The currently defined typical antenna configurations are {1T6R, 1T8R, 2T6R, 2T8R, [4T6R], 4T8R}, as shown in Table 1 below.

TABLE 1

| combination of SRS antenna switching configurations for up to 8 antennas | | |
|---|---|---|
| Tx\Rx | 6Rx | 8Rx |
| 1T | 1T6R | 1T8R |
| 2T | 2T6R | 2T8R |
| 4T | 4T6R | 4T8R |

In order to adapt to the current service or scenario, the terminal device may need to change the antenna configuration, for example, from 2T4R to 1T4R or 2T2R, or from 2T2R to 4T4R. In this case, different SRS resource configurations with the usage of "antenna switching" need to be used to obtain downlink CSI.

In the SRS enhancement of the R17 version, the number of antennas will be increased to 6/8Rx, the antenna switching supports more scenarios, and the corresponding SRS configuration is more complex.

When the number of antennas in the terminal device increases, one of the SRS used for antenna switching configuration may need to contain up to 4 SRS resource sets. The current SRS triggering request is 3 codepoints. Also, SRS triggering for other usages (such as "codebook", "non-codebook", "beam management") may be considered.

The R15/16 version does not support flexible and dynamic antenna switching configuration within BWP. If a dynamic antenna switching configuration scheme is introduced, the triggering problem becomes more complicated. Therefore, it is necessary to consider related methods for SRS triggering for multiple usages including multiple antenna switching configurations.

Based on the above problems, the present application provides a sound reference signal SRS triggering method for antenna switching. In order to better understand the sound reference signal SRS triggering method for antenna switching disclosed in the embodiments of the present application, the communication system used in the embodiments of the present application is first described below.

Figure 2:
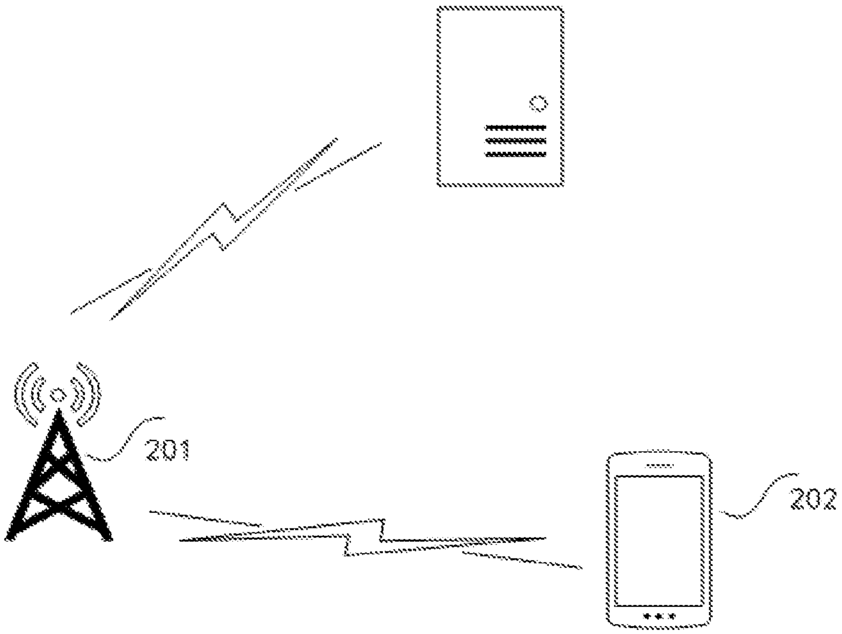
FIG. 2 is an architectural schematic diagram of a communication system provided by an embodiment of the present application.

Reference is made to FIG. 2, which is a schematic architectural diagram of a communication system provided by an embodiment of the present application. The communication system may include, but is not limited to, one terminal device and one network device. The number and form of devices shown in FIG. 2 are only for examples, and do not constitute any limitation on the embodiments of the present application. In actual applications, two or more terminal devices may be included, and two or more network devices may be included. The communication system shown in FIG. 2 includes a network device 201 and a terminal device 202 as an example.

It should be noted that the technical solutions in the embodiments of the present application may be applied to various communication systems, for example, long term evolution (LTE) system, 5th generation (5G) mobile communication system, 5G new radio (NR) system, or other new mobile communication systems in the future.

The network device 201 in the embodiments of the present application is an entity at the network side that is used to transmit or receive signals. For example, the network device 201 may be an evolved base station (evolved NodeB, eNB), a transmission reception point (TRP), a next generation base station (next generation NodeB, gNB) in an NR system, base stations in other mobile communication systems in the future, or access nodes in wireless fidelity (WiFi) systems, etc. The embodiments of this application do not limit the specific technology and specific equipment form used by the network device. The network device provided by the embodiments of the present application may be composed of a central unit (CU) and a distributed unit (DU). The CU may also be called a control unit. With the CU-DU structure, the protocol layers of the network device, such as base station, may be separated, where functions of some protocol layers are controlled by CU centrally, functions of some or all of the remaining protocol layers are distributed in the DU, and the CU centrally controls the DU.

The terminal device 201 in the embodiments of the present application is an entity at the user side that is used to receive or transmit signals, such as a mobile phone. The terminal device may also be called terminal equipment (terminal), user equipment (UE), mobile station (MS), mobile terminal (MT), etc. The terminal devices may be cars with communication functions, smart cars, mobile phones, wearable devices, tablets (Pads), computers with wireless transceiving functions, virtual reality (VR) terminal devices, augmented reality (AR) terminal devices, wireless terminal devices in industrial control, wireless terminal devices in self-driving, wireless terminal devices in remote medical surgery, wireless terminal devices in smart grid, wireless terminal devices in transportation safety, wireless terminal devices in smart city, wireless terminal devices in smart home, etc. The embodiments of the present application do not limit the specific technology and specific equipment form used by the terminal device.

It can be understood that the communication system described in the embodiments of the present application is to more clearly illustrate the technical solutions in the embodiments of the present application, and does not constitute any limitation on the technical solutions provided by the embodiments of the present application. As those of ordinary skill in the art may know, with the evolution of system architecture and the emergence of new service scenarios, the technical solutions provided in the embodiments of the present application are also applicable to similar technical problems.

The sound reference signal SRS triggering method and device for antenna switching provided by the present application will be introduced in detail below with reference to the accompanying drawings.

Figure 3:
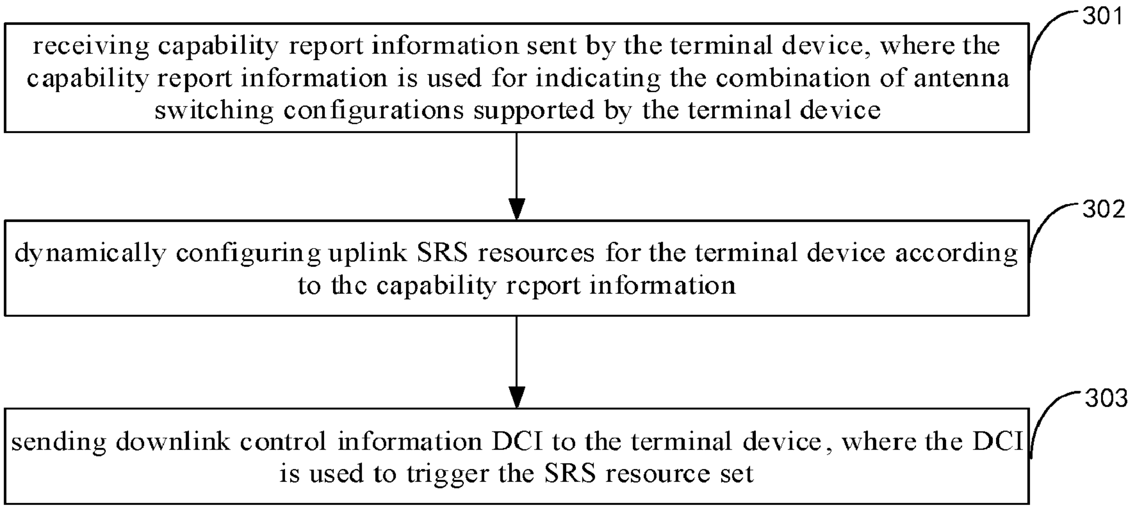
FIG. 3 is a flow chart of a sound reference signal SRS triggering method for antenna switching provided by an embodiment of the present application.

Reference may be made to FIG. 3, which is a flow chart of a sound reference signal SRS triggering method for antenna switching provided by an embodiment of the present application. It should be noted that the sound reference signal SRS triggering method for antenna switching in this embodiment of the present application is executed by the network device. As shown in FIG. 3, the sound reference signal SRS triggering method for antenna switching may include, but is not limited to, the following steps.

Step 301: receiving capability report information sent by the terminal device. The capability report information is used for indicating the combination of antenna switching configurations supported by the terminal device.

It can be understood that in order to adapt to the current service or scenario, the terminal device may need to change the antenna configuration, for example, from 2T4R to 1T4R or 2T2R, or from 2T2R to 4T4R. In this case, it is necessary to use different SRS resource configurations with the usage of "antenna switching" to obtain downlink CSI. In some embodiments, based on the current service or scenario, the terminal device may notify the network device that the terminal device needs to change the antenna configuration, and the terminal device may notify the network device by sending capability report information to the network device. For example, the terminal device may send the capability report information of the terminal device to the network device, so that the network device receives the capability report information sent by the terminal device. The capability report information may indicate the combination of antenna switching configurations supported by the terminal device.

In an implementation, the UE capabilities supported by terminals of different versions will also be different. That is to say, the combination of antenna switching configurations supported by the terminal will also be different. In order to enable more flexible and faster switching or fallback to different antenna switching configurations, the embodiment of the present application can report, by the terminal device, the combination of antenna switching configurations supported by the terminal device itself to the network device, so that the network device receives the capability report information sent by the terminal device and dynamically configures uplink SRS resources for the terminal device.

Step 302: dynamically configuring uplink SRS resources for the terminal device according to the capability report information.

In an implementation, the SRS for antenna switching configuration may allow the configuration of SRS resource sets of different antenna switching configurations that the UE can support through Radio Resource Control (RRC) signaling on the same bandwidth part BWP. Each antenna switching configuration may contain one or more aperiodic SRS resource sets. The SRS configured simultaneously also contains SRS resource sets for other usages (such as "codebook", "non-codebook", "beam management", etc.).

Step 303: sending downlink control information DCI to the terminal device, where the DCI is used to trigger the SRS resource set.

In an embodiment of the present application, the SRS resource set corresponds to the antenna switching configuration.

In an implementation, the SRS resource set may include an SRS resource set corresponding to the antenna switching configuration, and the SRS resource set may also include at least one SRS resource set for other usages. For example, one or more SRS resource sets for other usages (such as "codebook", "non-codebook", "beam management", etc.) may also be included.

"SRS configuration" in the present disclosure refers to the parameter values that the network device arranges for the terminal UE to comply with; and "SRS triggering" refers to the action of the network device transmitting the SRS parameter values configured by the network device to the terminal device through control signaling.

In some embodiments, after dynamically configuring uplink SRS resources for the terminal device according to the capability report information, the network device may use DCI to implement flexible SRS resource triggering. For example, the network device may send DCI to the terminal device, and the DCI may be used to trigger an SRS resource set. The SRS resource set may include the SRS resource set configuration corresponding to the antenna switching configuration, and may also include one or more SRS resource sets for other usages (such as "codebook", "non-codebook", "beam management", etc.).

It should be noted that the embodiments of the present application provide several methods for using DCI on the same BWP to implement flexible SRS resource triggering. For example, the SRS request indication field in DCI signaling may be extended, or the SRS request indication field may be used and redefined, or the bits in the existing DCI field and other unused DCI fields may be used, or the codepoints in the existing DCI field and other unused DCI fields may be used, or the extended DCI2-3 may be used, or a new group common-downlink control information GC-DCI may be adopted, etc. These methods will be described in detail below.

In some embodiments of the present application, the network device may send downlink control information DCI to the terminal device. The DCI contains an extended aperiodic SRS request indication field. The extended SRS request indication field instructs the terminal device to trigger one or more SRS resource sets.

As an example, the one or more SRS resource sets may include the SRS set configuration corresponding to the specified antenna switching configuration. Alternatively, the one or more SRS resource sets may include at least some of the SRS resource sets corresponding to the specified antenna switching configuration. The term "at least some" may be understood as "some" or "all".

In an implementation, the above-mentioned extended SRS request indication field sets different SRS resource sets respectively. The aperiodic SRS resource trigger parameters corresponding to the different SRS resource sets are the same or different, and the triggering is made through the codepoint corresponding to the expanded SRS trigger parameter.

For example, the network device may instruct the terminal to trigger one or more SRS resource sets by extending the SRS request indication field in the DCI signaling. The one or more SRS resource sets may include the SRS set configuration corresponding to the antenna switching used for sending, or may also include all or some of the SRS resource sets corresponding to a certain antenna switching configuration. For example, the extended SRS request indication field sets the aperiodic SRS resource trigger parameters (aperiodicSRS-ResourceTrigger) corresponding to the SRS resource sets of different functions to be the same same or different values, and the triggering is accomplished by the codepoint corresponding to the expanded SRS trigger parameter (SBS trigger codepoint). For another example, the extended SRS request indication field sets the aperiodic SRS resource trigger parameters corresponding to the SRS resource set of the same antenna switching configuration to be the same value or different values, and the triggering is accomplished through the codepoint corresponding to the extended SRS trigger parameter. Therefore, the network device can implement flexible SRS resource triggering by extending the SRS request indication field in the DCI signaling.

In some embodiments of the present application, the network device may send extended downlink control information DCI to the terminal device. The extended DCI includes a redefined aperiodic SRS request indication field. The redefined SRS request indication field is used to trigger the SRS resource set for at least one usage, where the at least one usage includes antenna switching configuration. The SRS resource set for at least one usage may be understood as the SRS resource set for one or more usages including the antenna switching configuration.

As an example, the above-mentioned triggering of the SRS resource set for at least one usage may include: configuring a bitmap for activation, where the bitmap is composed of the identification ID corresponding to the SRS resource set for each usage in the at least one usage. The bitmap contains the identification ID of the SRS resource set corresponding to the antenna switching configuration.

As another example, the above-mentioned triggering of the SRS resource set for at least one usage may include: configuring a codepoint for activation, wherein the codepoint is composed of the identification ID corresponding to the SRS resource set for each usage in the at least one usage. The codepoint contains the identification ID of the SRS resource set corresponding to the antenna switching configuration.

For example, the network device may use and redefine the aperiodic SRS request indication field in DCI for triggering the SRS resource set corresponding to one or more usages that can include antenna switching configurations. A bitmap or codepoint may be separately configured, which bitmap or codepoint is composed of the SRS resource sets for various usages including the identification ID corresponding to the SRS resource sets of various antenna switching configurations, such as t1r1-t1r2-t1r4. If t1r1/t1r2/t1r4 is configured as "010", then for activating t1r2, the corresponding SRS resource set configuration is configured. Therefore, the network device can implement flexible SRS resource triggering by redefining the aperiodic SRS request indication field in DCI.

In some embodiments of the present application, the network device may send downlink control information DCI to the terminal device. The DCI includes a DCI field for antenna switching configuration and other usage DCI fields. The bits in the DCI field and the other usage DCI fields jointly indicate the codepoint corresponding to the SRS resource set that needs to be triggered.

For example, the network device may use the bits in the existing DCI field and other unused DCI fields to jointly indicate the codepoint corresponding to the SRS resource set that needs to be triggered. For example, when DCI0-1/0-2 uses SRS trigger without data and without CSI (SRS trigger parameter without data and without CSI) for triggering, the unused field, such as TPC, FDRA, TDRA, etc., is used in the meantime to jointly trigger SRS resources. As a result, the network device can implement flexible SRS resource triggering through bits in the existing DCI field and other unused DCI fields.

In some embodiments of the present application, the network device may send downlink control information DCI to the terminal device. The DCI includes codepoints in the DCI field for antenna switching configuration and other unused DCI fields. The codepoints in the DCI field and other unused DCI fields jointly indicate all trigger codepoints.

For example, the network device may use codepoints in the existing DCI field and other unused DCI fields to jointly indicate all trigger codepoints, and a joint indication is made through the two DCI indication fields. Specific joint indication rules need to be defined. For example, the Demodulation Reference Signal (DMRS) antenna port indicates the codepoints in the field. Thus, the network device can use codepoints in the existing DCI fields and other unused DCI fields to implement flexible SRS resource triggering.

In some embodiments of the present application, the network device may send extended DCI2-3 signaling to the terminal device. The extended DCI2-3 signaling is used to indicate the trigger codepoint corresponding to the SRS triggering request field, and is used to enhance the SRS triggering for a group of terminal devices.

For example, the network device may use extended DCI2-3 to indicate the trigger codepoint corresponding to the SRS triggering request field, and this may be used for the enhanced SRS triggering for a group of UEs, thereby saving signaling overhead. Therefore, the network device can use the extended DCI2-3 for indicating the SRS triggering request field to implement flexible SRS resource triggering.

In some embodiments of the present application, the network device may send group common-downlink control information GC-DCI to the terminal device. The GC-DCI is used to indicate the trigger codepoint corresponding to the SRS triggering request field, and is used to enhance the SRS triggering for a group of terminal devices.

For example, the network device may introduce a new GC-DCI to indicate the trigger codepoint corresponding to the SRS triggering request field, and this may be used for the enhanced SRS triggering for a group of UEs, thereby saving signaling overhead. Therefore, the network device can introduce a new GC-DCI for indicating the SRS triggering request field to implement flexible SRS resource triggering.

In some embodiments of the present application, the network device may also update the trigger codepoint corresponding to the above method through the media access control control unit MAC CE, which can be used for quick configuration.

By implementing the embodiments of the present application, DCI can be used on the same BWP to implement flexible SRS resource triggering, and the switch or fall back can be accomplished more flexibly and quickly to different antenna switching configurations, thereby meeting the antenna requirements of the current service or scenario.

Figure 4:
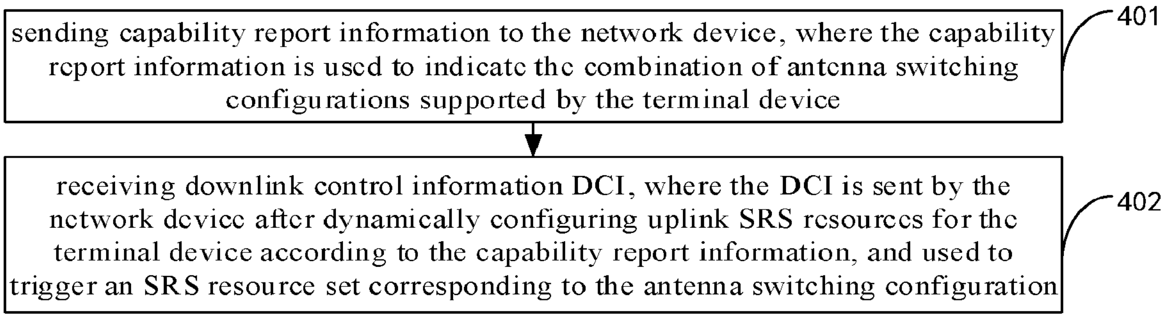
FIG. 4 is a flow chart of yet another sound reference signal SRS triggering method for antenna switching provided by an embodiment of the present application.

It can be understood that the above embodiments describe the implementations of the sound reference signal SRS triggering method for antenna switching in the embodiments of the present application from the network device side. The embodiments of the present application also propose a sound reference signal SRS triggering method for antenna switching. The implementations of the sound reference signal SRS triggering method for antenna switching will be described below from the terminal device side. References may be made to FIG. 4, which is a flow chart of yet another sound reference signal SRS triggering method for antenna switching provided by an embodiment of the present application. It should be noted that the sound reference signal SRS triggering method for antenna switching in the embodiments of the present application may be applied to a terminal device. As shown in FIG. 4, the sound reference signal SRS triggering method for antenna switching may include, but is not limited to, the following steps.

Step 401: sending capability report information to the network device. The capability report information is used to indicate the combination of antenna switching configurations supported by the terminal device. It can be understood that in order to adapt to the current service or scenario, the terminal device may need to change the antenna configuration, for example, from 2T4R to 1T4R or 2T2R, or from 2T2R to 4T4R. In this case, it is necessary to use different SRS resource configurations with the usage of "antenna switching" to obtain downlink CSI. In some embodiments, according to the current service or scenario, the terminal device may notify the network device that the terminal device needs to change the antenna configuration, and the terminal device may notify the network device by sending capability report information to the network device. For example, the terminal device may send the capability report information of the terminal device to the network device, so that the network device receives the capability report information sent by the terminal device. The capability report information may indicate the combination of antenna switching configurations supported by the terminal device.

In an implementation, the UE capabilities supported by terminals of different versions will also be different. That is to say, the combination of antenna switching configurations supported by the terminal will also be different. In order to enable more flexible and faster switching or fallback to different antenna switching configurations, the embodiments of the present application can report by the terminal device the combination of antenna switching configurations supported by the terminal device itself to the network device. Thus, the network device receives the capability report information sent by the terminal device and can dynamically configure uplink SRS resources for the terminal device.

Step 402: receiving downlink control information DCI, where the DCI is sent by the network device after dynamically configuring uplink SRS resources for the terminal device according to the capability report information. The DCI is used to trigger an SRS resource set that corresponds to the antenna switching configuration.

As an example, the SRS resource set may include an SRS resource set corresponding to the antenna switching configuration, and may further include at least one SRS resource set for other usages.

In an implementation, with respect to the SRS configured for antenna switching, the configuration of SRS resource sets of different antenna switching configurations that the UE can support is allowed to be made through Radio Resource Control (RRC) signaling on the same bandwidth part BWP. Each antenna switching configuration may contain one or more aperiodic SRS resource sets, and the SRS configured simultaneously also contains SRS resource sets for other usages (such as "codebook", "non-codebook", "beam management", etc.).

In some embodiments, after dynamically configuring uplink SRS resources for the terminal device based on the capability report information, the network device may use DCI to implement flexible SRS resource triggering. For example, the network device may send DCI to the terminal device, so that the terminal device can receive the DCI sent by the network device. The DCI may be used to trigger an SRS resource set. The SRS resource set may include the SRS resource set configuration corresponding to the antenna switching configuration, and may also include one or more SRS resource sets for other usages (such as "codebook", "non-codebook", "beam management", etc.).

It should be noted that the embodiments of the present application provide several methods for using DCI on the same BWP to implement flexible SRS resource triggering. For example, the SRS request indication field in DCI signaling may be extended, or the SRS request indication field may be used and redefined, or the bits in the existing DCI field and other unused DCI fields may be used, or the codepoints in the existing DCI field and other unused DCI fields may be used, or the extended DCI2-3 may be used, or a new group common-downlink control information GC-DCI is proposed, etc. These methods will be described in detail below.

In some embodiments of the present application, the terminal device may receive downlink control information DCI, and the DCI is sent by the network device after dynamically configuring the uplink SRS resources for the terminal device according to the capability report information. The DCI includes an extended aperiodic SRS request indication field, and the extended SRS request indication field instructs the terminal device to trigger one or more SRS resource sets.

As an example, the one or more SRS resource sets may include the SRS set configuration corresponding to the specified antenna switching configuration. Alternatively, the one or more SRS resource sets may include at least some of the SRS resource sets corresponding to the specified antenna switching configuration. The term "at least some" may be understood as "some" or "all".

In an implementation, the above-mentioned extended SRS request indication field sets different SRS resource sets respectively. The aperiodic SRS resource trigger parameters corresponding to the different SRS resource sets may be the same or different, and the triggering is accomplished through the codepoint corresponding to the expanded SRS trigger parameter.

For example, the network device may instruct the terminal to trigger one or more SRS resource sets by extending the SRS request indication field in DCI signaling. The one or more SRS resource sets may include the SRS set configuration corresponding to the antenna switching used for sending, or may also include all or some of the SRS resource sets corresponding to a certain antenna switching configuration. For example, the extended SRS request indication field sets the aperiodic SRS resource trigger parameters (aperiodicSRS-ResourceTrigger) corresponding to the SRS resource sets for different usages to be the same value or different values, and the triggering is made through the codepoint corresponding to the expanded SRS trigger parameter (SRS trigger codepoint). For another example, the extended SRS request indication field is used to respectively set the SRS resource sets for the same antenna switching configuration. The aperiodic SRS resource trigger parameters corresponding to the SRS resource set for the same antenna switching configuration have the same or different values, and the triggering is done through the codepoint corresponding to the extended SRS trigger parameter. Thus, the terminal device determines the configuration of the SRS resources by the network device by receiving the DCI signaling sent by the network device, so that antenna switching can be performed.

In some embodiments of the present application, the terminal device may receive extended downlink control information DCI, where the extended DCI is sent by the network device after dynamically configuring uplink SRS resources for the terminal device according to the capability report information. The extended DCI includes redefined aperiodic SRS request indication field, and the redefined SRS request indication field is used to trigger an SRS resource set for at least one usage, where the at least one usage includes antenna switching configuration. The SRS resource set for the at least one usage can be understood as follows.

As an example, the above-mentioned triggering of the SRS resource set for at least one usage may include configuring a bitmap for activation, where the bitmap is composed of the identification ID corresponding to the SRS resource set for each usage in the at least one usage. The bitmap contains the identification ID of the SRS resource set corresponding to the antenna switching configuration.

As another example, the above-mentioned triggering of the SRS resource set for at least one usage may include: configuring a codepoint for activation, where the codepoint is composed of the identification ID corresponding to the SRS resource set for each usage in the at least one usage. The codepoint contains the identification ID of the SRS resource set corresponding to the antenna switching configuration.

For example, the network device may use and redefine the aperiodic SRS request indication field in DCI for triggering an SRS resource set corresponding to one or more usages that may include antenna switching configuration. A bitmap or codepoint may be separately configured for activation, and the bitmap or codepoint is composed of the SRS resource set for various usages including the identification ID corresponding to the SRS resource set for various switching configurations, such as t1r1-t1r2-t1r4. If t1r1/t1r2/t1r4 is configured as "010", then for activating t1r2, the corresponding SRS resource set configuration is configured. Therefore, the network device can implement flexible SRS resource triggering by redefining the aperiodic SRS request indication field in DCI. The terminal device may determine the configuration of SRS resources by the network device by receiving the DCI signaling sent by the network device, so that antenna switching can be performed.

In some embodiments of the present application, the terminal device may receive downlink control information DCI, where the DCI is sent by the network device after dynamically configuring uplink SRS resources for the terminal device according to the capability report information. The DCI includes a DCI field for antenna switching configuration and other unused DCI field. The bits in the DCI field and the other unused DCI fields jointly indicate the codepoint corresponding to the SRS resource set that needs to be triggered.

For example, the network device may use the bits in the existing DCI field and other unused DCI fields to jointly indicate the codepoint corresponding to the SRS resource set that needs to be triggered. For example, when DCI0-1/0-2 uses SRS trigger without data and without CSI (SRS trigger parameter without data and without CSI) for triggering, the unused field, such as TPC, FDRA, TDRA, etc., is used in the meantime to jointly trigger SRS resources. As a result, the network device can implement flexible SRS resource triggering through bits in the existing DCI field and other unused DCI fields. The terminal device can determine the configuration of SRS resources by the network device by receiving the DCI signaling sent by the network device, so that antenna switching can be performed.

In some embodiments of the present application, the terminal device may receive downlink control information DCI, where the DCI is sent by the network device after dynamically configuring uplink SRS resources for the terminal device according to the capability report information. The DCI includes codepoints in the DCI field for antenna switching configuration and other unused DCI fields. The codepoints in the DCI field and other unused DCI fields jointly indicate all trigger codepoints.

For example, the network device may use the codepoints in the existing DCI field and other unused DCI fields to jointly indicate all trigger codepoints, and the joint indication is made through the two DCI indication fields. Specific joint indication rules need to be defined. For example, the Demodulation Reference Signal (DMRS) antenna port indicates the codepoints in the field. Thus, the network device may use the codepoints in the existing DCI fields and other unused DCI fields to implement flexible SRS resource triggering. The terminal device can determine the configuration of SRS resources by the network device by receiving the DCI signaling sent by the network device, so that antenna switching can be performed.

In some embodiments of the present application, the terminal device may receive extended DCI2-3 signaling, where the extended DCI2-3 signaling is sent by the network device after dynamically configuring uplink SRS resources for the terminal device according to the capability report information. The extended DCI2-3 signaling is used to indicate the trigger codepoint corresponding to the SRS triggering request field, and is used to enhance the SRS triggering for a group of terminal devices.

For example, the network device may use extended DCI2-3 to indicate the trigger codepoint corresponding to the SRS triggering request field, and this can be used for the enhanced SRS triggering for a group of UEs, thereby saving signaling overhead. Therefore, the network device may use the extended DCI2-3 for indicating the SRS triggering request field to implement flexible SRS resource triggering. The terminal device can determine the configuration of SRS resources by the network device by receiving the DCI signaling sent by the network device, so that antenna switching can be performed.

In some embodiments of the present application, the terminal device may receive the group common-downlink control information GC-DCI, where the GC-DCI is sent by the network device after dynamically configuring the uplink SRS resources for the terminal device according to the capability report information. The GC-DCI is used to indicate the trigger codepoint corresponding to the SRS triggering request field, and is used to enhance the SRS triggering for a group of terminal devices.

For example, the network device may introduce a new GC-DCI to indicate the trigger codepoint corresponding to the SRS triggering request field, and this can be used for the enhanced SRS triggering for a group of UEs, thereby saving signaling overhead. Therefore, the network device can introduce a new GC-DCI for indicating the SRS triggering request field to achieve flexible SRS resource triggering. The terminal device can determine the configuration of SRS resources by the network device by receiving the DCI signaling sent by the network device, so that antenna switching can be performed.

In some embodiments of the present application, the terminal device may also receive the media access control control unit MAC CE sent by the network device. The MAC CE is used to update the corresponding trigger codepoint. In other words, the network device may also update the trigger codepoint corresponding to the above method through the media access control control unit MAC CE, which can be used for quick configuration. In this way, when the terminal device receives the MAC CE sent by the network device, it can be used to update the corresponding trigger codepoint, thereby achieving the purpose of rapid configuration.

By implementing the embodiments of the present application, DCI can be used on the same BWP to implement flexible SRS resource triggering, and the switch or fallback can be accomplished more flexibly and quickly to different antenna switching configurations, thereby meeting the antenna requirements of the current service or scenario.

In the above embodiments provided by the present application, the methods provided by the embodiments of the present application are introduced from the perspectives of network device and terminal device respectively. In order to implement each function in the method provided by the above embodiments of the present application, network device and terminal device may include hardware structures and software modules to implement the above functions in the form of hardware structures, software modules, or hardware structures plus software modules. A certain function among the above functions may be executed by a hardware structure, a software module, or a hardware structure plus a software module.

Figure 5:
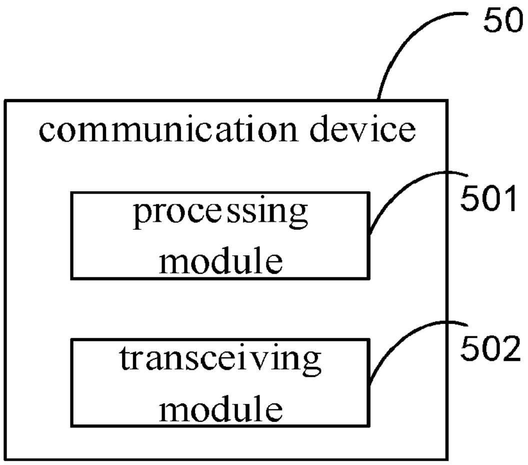
FIG. 5 is a schematic structural diagram of a communication device provided by an embodiment of the present application.

References may be made to FIG. 5, which is a schematic structural diagram of a communication device 50 provided by an embodiment of the present application. The communication device 50 shown in FIG. 5 may include a processing module 501 and a transceiving module 502. The transceiving module 502 may include a sending module and/or a receiving module. The sending module is used to implement the sending function, and the receiving module is used to implement the receiving function. The transceiving module 502 may implement the sending function and/or the receiving function.

The communication device 50 may be a network device, a device in the network device, or a device that can be used in conjunction with the network device. Alternatively, the communication device 50 may be a terminal device, a device in the terminal device, or a device that can be used in conjunction with the terminal device.

The communication device 50 is a network device. In an embodiment of the present application, the transceiving module 502 is used to receive the capability report information sent by the terminal device, and the capability report information is used to represent the combination of antenna switching configurations supported by the terminal device. The processing module 501 is used to dynamically configure uplink SRS resources for the terminal device according to the capability report information. The transceiving module 502 is also used to send downlink control information DCI to the terminal device. The DCI is used to trigger an SRS resource set, and the SRS resource set corresponds to the antenna switching configuration. As an example, the SRS resource set may include an SRS resource set corresponding to the antenna switching configuration and at least one SRS resource set for other usages.

In an implementation, the DCI is used to trigger the SRS resource set corresponding to the antenna switching configuration, including the DCI includes an extended aperiodic SRS request indication field, and the extended aperiodic SRS request indication field instructs the terminal device to trigger at least one SRS resource set.

In a possible implementation, at least one SRS resource set includes the SRS set configuration corresponding to a specified antenna switching configuration; or, at least one SRS resource set includes at least some of the SRS resource sets corresponding to the specified antenna switching configuration.

In a possible implementation, the extended aperiodic SRS request indication field instructs the terminal device to trigger at least one SRS resource set, including: the extended aperiodic SRS request indication field sets different SRS resource sets respectively, the aperiodic SRS resource trigger parameters corresponding to the different SRS resource sets are the same or different, and the triggering is done by a codepoint corresponding to the expanded SRS resource trigger parameter.

In a possible implementation, the extended aperiodic SRS request indication field instructs the terminal device to trigger at least one SRS resource set, further including: the extended aperiodic SRS request indication field respectively sets the SRS resource sets of the same antenna switching configuration, the aperiodic SRS resource trigger parameters corresponding to the SRS resource sets of the same antenna switching configuration are the same or different, and the triggering is done by the codepoint corresponding to the expanded SRS resource trigger parameter.

In an implementation, the transceiving module 502 is specifically configured to: send extended downlink control information DCI to the terminal device. The extended DCI includes a redefined aperiodic SRS request indication field. The redefined aperiodic SRS request indication field is used to trigger the SRS resource set for at least one usage, where the at least one usage includes the antenna switching configuration.

In a possible implementation, triggering the SRS resource set for at least one usage, where the at least one usage includes the antenna switching configuration, includes: configuring a bitmap for activation, where the bitmap is composed of the identification ID corresponding to the SRS resource set for each usage in the at least one usage. The bitmap contains the identification ID of the SRS resource set corresponding to the antenna switching configuration.

In a possible implementation, triggering the SRS resource set for at least one usage, where the at least one usage includes the antenna switching configuration, includes: configuring a codepoint for activation, where the codepoint is composed of the identification ID corresponding to the SRS resource set for each usage in the at least one usage. The codepoint includes the identification ID of the SRS resource set corresponding to the antenna switching configuration.

In an implementation, the transceiving module 502 is specifically configured to: send downlink control information DCI to the terminal device. The DCI includes a DCI field for antenna switching configuration and other unused DCI fields. The bits in the DCI field and other unused DCI fields joint indicate the codepoint corresponding to the SRS resource set that needs to be triggered.

In an implementation, the transceiving module 502 is specifically configured to: send downlink control information DCI to the terminal device. The DCI includes codepoints in the DCI field for antenna switching configuration and other unused DCI fields. The codepoints in the DCI field and other unused DCI fields jointly indicate all trigger codepoints.

In an implementation, the transceiving module 502 is specifically configured to send extended DCI2-3 signaling to the terminal device. The extended DCI2-3 signaling is used to indicate the trigger codepoint corresponding to the SRS triggering request field, and is used to enhance the SRS triggering for a group of terminal devices. Alternatively, the transceiving module 502 is configured to send group common-downlink control information GC-DCI to the terminal device. The GC-DCI is used to indicate the trigger codepoint corresponding to the SRS triggering request field, and is used to enhance the SRS triggering for a group of terminal devices.

In an implementation, the processing module 501 is further configured to update the corresponding trigger codepoint through the media access control control unit MAC CE.

The communication device 50 is a terminal device. In an embodiment of the present application, the transceiving module 502 is used to send capability report information to the network device, and the capability report information is used to represent the combination of antenna switching configurations supported by the terminal device. The transceiving module 502 is further used to receive downlink control information DCI, where the DCI is sent by the network device after dynamically configuring uplink SRS resources for the terminal device according to the capability report information. The DCI is used for the SRS resource set, and the SRS resource set corresponds to the antenna switching configuration. As an example, the SRS resource set includes an SRS resource set corresponding to the antenna switching configuration and at least one SRS resource set for other usages.

In an implementation, the DCI is used to trigger an SRS resource set, and the SRS resource set corresponds to the antenna switching configuration, including: the DCI contains an extended aperiodic SRS request indication field, and the extended aperiodic SRS request indication field instructs the terminal device to trigger at least one SRS resource set.

In a possible implementation, at least one SRS resource set includes the SRS set configuration corresponding to a specified antenna switching configuration. Alternatively, at least one SRS resource set includes at least some of the SRS resource sets corresponding to the specified antenna switching configuration.

In a possible implementation, the extended aperiodic SRS request indication field instructs the terminal device to trigger at least one SRS resource set, including: the extended SRS request indication field sets different SRS resource sets respectively, the aperiodic SRS resource trigger parameters corresponding to the different SRS resource sets are the same or different, and the triggering is made by a codepoint corresponding to the expanded SRS resource trigger parameter.

In a possible implementation, the extended aperiodic SRS request indication field instructs the terminal device to trigger at least one SRS resource set, further including: the extended aperiodic SRS request indication field respectively sets the SRS resource sets for the same antenna switching configuration, the aperiodic SRS resource trigger parameters corresponding to the SRS resource sets for the same antenna switching configuration are the same or different, and the triggering is done by the codepoint corresponding to the expanded SRS resource trigger parameter.

In an implementation, the transceiving module 502 is specifically configured to receive extended downlink control information DCI, where the extended DCI is sent by the network device after dynamically configuring uplink SRS resources for the terminal device according to the capability report information. The extended DCI contains a redefined aperiodic SRS request indication field, the redefined aperiodic SRS request indication field is used to trigger an SRS resource set for at least one usage, and the at least one usage includes the antenna switching configuration.

In a possible implementation, triggering the SRS resource set for at least one usage, where the at least one usage includes the antenna switching configuration, includes: configuring a bitmap for activation, where the bitmap is composed of the identification ID corresponding to the SRS resource set for each usage in the at least one usage. The bitmap contains the identification ID of the SRS resource set corresponding to the antenna switching configuration.

In a possible implementation, triggering the SRS resource set for at least one usage, where the at least one usage includes the antenna switching configuration, includes: configuring a codepoint for activation, where the codepoint is composed of the identification ID corresponding to the SRS resource set for each usage in the at least one usage. The codepoint contains the identification ID of the SRS resource set corresponding to the antenna switching configuration.

In an implementation, the transceiving module 502 is specifically configured to receive downlink control information DCI, where the DCI is sent by the network device after dynamically configuring uplink SRS resources for the terminal device according to the capability report information. The DCI includes a DCI field for antenna switching configuration and other unused DCI fields. The bits in the DCI field and other unused DCI fields jointly indicate the codepoint corresponding to the SRS resource set that needs to be triggered.

In an implementation, the transceiving module 502 is specifically configured to receive downlink control information DCI, where the DCI is sent by the network device after dynamically configuring uplink SRS resources for the terminal device according to the capability report information. The DCI includes codepoints in a DCI field for antenna switching configuration and other unused DCI fields. The codepoints in the DCI field and other unused DCI fields jointly indicate all trigger codepoints.

In an implementation, the transceiving module 502 is specifically configured to receive extended DCI2-3 signaling, where the extended DCI2-3 signaling is sent by the network device after dynamically configuring uplink SRS resources for the terminal device according to the capability report information. The extended DCI2-3 signaling is used for indicating the trigger codepoint corresponding to the SRS triggering request field, and is used to enhance the SRS triggering for a group of terminal devices. Alternatively, the transceiving module 502 is configured to receive group common-downlink control information GC-DCI, where the GC-DCI is sent by the network device after dynamically configuring uplink SRS resources for the terminal device based on the capability report information. The GC-DCI is used to indicate the trigger codepoint corresponding to the SRS triggering request field, and is used to enhance the SRS triggering for a group of terminal devices.

In an implementation, the transceiving module 502 is further configured to receive the media access control control unit MAC CE sent by the network device. The MAC CE is used to update the corresponding trigger codepoint.

Regarding the devices in the above embodiments, the specific manner in which each module performs operations has been described in detail in the embodiments related to the method, and will not be described in detail here.

Figure 6:
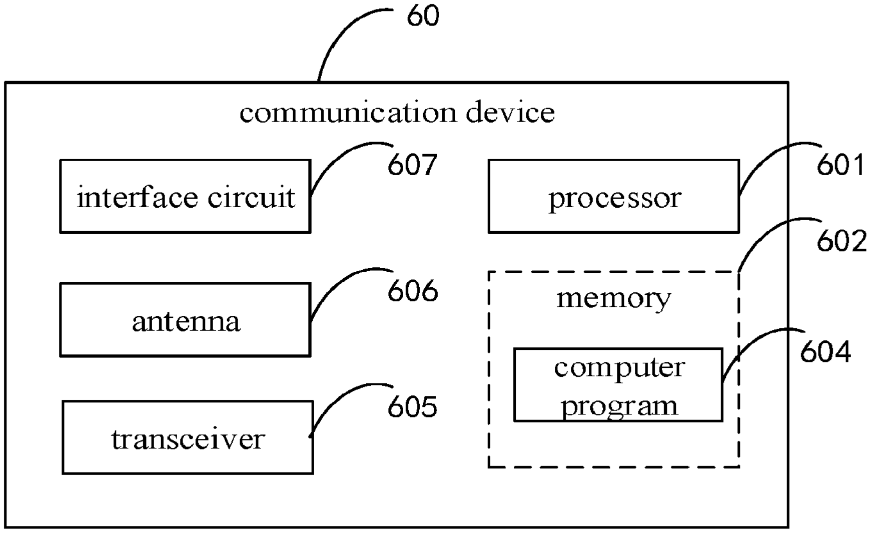
FIG. 6 is a schematic structural diagram of another communication device provided by an embodiment of the present application.

References may be made FIG. 6, which is a schematic structural diagram of another communication device 60 provided by an embodiment of the present application. The communication device 60 may be a network device, a terminal device, or a chip, a chip system, or a processor that supports a network device to implement the above methods, or a chip, a chip system, or a processor that supports a terminal device to implement the above methods, etc. The device may be used to implement the method described in the above method embodiments. For details, references may be made to the description in the above method embodiments.

The communication device 60 may include one or more processors 601. The processor 601 may be a general-purpose processor or a special-purpose processor, or the like. For example, the processor 601 may be a baseband processor or a central processing unit. The baseband processor may be used to process communication protocols and communication data. The central processor may be used to control communication devices (such as base stations, baseband chips, terminal devices, terminal device chips, DU, or CU, etc.), execute computer programs, and process data for computer programs.

In some embodiments, the communication device 60 may also include one or more memories 602, on which a computer program 604 may be stored. The processor 601 executes the computer program 604, so that the communication device 60 performs the steps described in the above method embodiments. In some embodiments, the memory 602 may also store data. The communication device 60 and the memory 602 may be provided separately or integrated together.

In some embodiments, the communication device 60 may also include a transceiver 605 and an antenna 606. The transceiver 605 may be called a transceiver unit, a transceiver circuit, etc., and is used to implement transceiving functions. The transceiver 605 may include a receiver and a transmitter. The receiver may be called a receiving circuit, etc., and is used to implement the receiving function. The transmitter may be called a transmitting circuit, etc., and is used to implement the transmitting function.

In some embodiments, the communication device 60 may also include one or more interface circuits 607. The interface circuit 607 is used to receive code instructions and transmit them to the processor 601. The processor 601 executes the code instructions to cause the communication device 60 to perform the method described in the above method embodiments.

The communication device 60 is a network device. The processor 601 is used to perform step 302 in FIG. 3. The transceiver 605 is used to perform step 301 and step 303 in FIG. 3.

The communication device 60 is a terminal device. The transceiver 605 is used to perform steps 401 and 402 in FIG. 4.

In an implementation, the processor 601 may include a transceiver for implementing receiving and transmitting functions. For example, the transceiver may be a transceiving circuit, an interface, or an interface circuit. The transceiving circuits, interfaces, or interface circuits used to implement the receiving and transmitting functions may be separate or integrated together. The above-mentioned transceiving circuit, interface, or interface circuit may be used for reading and writing codes/data. Alternatively, the above-mentioned transceiving circuit, interface, or interface circuit may be used for signal transmission or transfer.

In an implementation, the processor 601 may store a computer program 603, and the computer program 603 runs on the processor 601, causing the communication device 60 to perform the method described in the above method embodiments. The computer program 603 may be solidified in the processor 601, in which case the processor 601 may be implemented by hardware.

In an implementation, the communication device 60 may include a circuit, and the circuit may implement the functions of sending or receiving or communicating in the foregoing method embodiments. The processor and transceiver described in the present application may be implemented in integrated circuits (ICs), analog ICs, radio frequency integrated circuits RFICs, mixed signal ICs, application specific integrated circuits (ASICs), printed circuit boards (PCBs), electronic devices, etc. The processor and transceiver may also be manufactured using various IC process technologies, such as complementary metal oxide semiconductor (CMOS), n-type metal-oxide-semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a receiving end or a transmitting end, but the scope of the communication device described in the present application is not limited thereto, and the structure of the communication device may not be limited by FIG. 6. The communication device may be a stand-alone device or may be part of a larger device. For example, the communication device may be:

(1) an independent integrated circuit IC, or chip, or chip system, or subsystem;

(2) a collection of one or more ICs, where, in some embodiments, the IC collection may also include storage components for storing data and computer programs;

(3) ASIC, such as modem;

(4) a module that can be embedded in other devices;

(5) a receiver, terminal device, intelligent terminal device, cellular phone, wireless device, handheld machine, mobile unit, vehicle-mounted device, network device, cloud device, artificial intelligence device, etc.;

(6) others, etc.

Those skilled in the art can also understand that the various illustrative logical blocks and steps listed in the embodiments of the present application can be implemented by electronic hardware, computer software, or a combination of both. Whether such functionality is implemented in hardware or software depends on the specific application and the overall system design requirements. Those skilled in the art can use various methods to implement the described functions for each specific application, but such implementation should not be understood as departing from the protection scope of the embodiments of the present application.

Embodiments of the present application also provide a communication system for the sound reference signal SRS triggering for antenna switching. The system includes the communication device as the network device and the communication device as the terminal device in the above embodiment of FIG. 5. Alternatively, the system includes the communication device as the network device and the communication device as the terminal device in the above embodiment of FIG. 6.

The present application also provides A non-transitory computer readable storage medium on which instructions are stored. When the instructions are executed by a computer, the functions of any of the above method embodiments are implemented.

The present application further provides a computer program product, which, when executed by a computer, implements the functions of any of the above method embodiments.

In the above embodiments, the implementation may be in whole or in part by software, hardware, firmware, or any combination thereof. When implemented using software, it may be implemented in whole or in part in the form of a computer program product. The computer program product includes one or more computer programs. When the computer program is loaded and executed on a computer, the processes or functions described in the embodiments of the present application are generated in whole or in part. The computer may be a general-purpose computer, a special-purpose computer, a computer network, or other programmable device. The computer program may be stored in a non-transitory computer-readable storage medium, or transferred from one computer-readable storage medium to another. For example, the computer program may be transmitted from a website, computer, server, or data center to another website, computer, server, or data center via wired means (such as coaxial cable, optical fiber, digital subscriber line (DSL)) or wireless means (such as infrared, wireless, microwave, etc.). The non-transitory computer-readable storage medium may be any available medium that can be accessed by a computer, or a data storage device such as a server, data center, etc. that contains one or more available media integrated. The available media may be magnetic media (e.g., floppy disks, hard disks, magnetic tapes), optical media (e.g., high-density digital video discs (DVD)), or semiconductor media (e.g., solid state disks, SSD)) etc.

Persons of ordinary skill in the art can understand that the first, second, and other numerical numbers involved in the present application are only for convenience of description, and are not used to limit the scope of the embodiments of the present application, and they may also indicate the sequential order.

At least one in the present application may also be described as one or more, and the plurality may be two, three, four, or more, which is not limited by the present application. In the embodiments of the present application, for a specific type of technical features, the technical features in this specific type is distinguished by “first”, “second”, “third”, “A”, “B”, “C”, and “D”, etc. The technical features described by “first”, “second”, “third”, “A”, “B”, “C” and “D” are in no particular sequential order or size order.

The corresponding relationships shown in each table in the present application may be configured or predefined. The values of the information in each table are only examples, and may be configured as other values, which are not limited by the present application. When configuring the correspondence between information and each parameter, it is not necessarily required to configure all the correspondences shown in each table. For example, in the table of the present application, the corresponding relationships shown in some rows may not be configured. For another example, appropriate deformation adjustments may be made based on the above table, such as splitting, merging, etc. The names of the parameters shown in the titles of the above tables may also be other names understandable for the communication device, and the values or expressions of the parameters may also be other values or expressions understandable for the communication device. When implementing the above tables, other data structures may also be used, such as arrays, queues, containers, stacks, linear lists, pointers, linked lists, trees, graphs, structures, classes, heaps, hashing tables, or hash tables.

The term of predefinition in the present application may be understood as definition, pre-definition, storage, pre-storage, pre-negotiation, pre-configuration, solidification, or pre-burning.

Those of ordinary skill in the art will appreciate that the units and algorithm steps of each example described in conjunction with the embodiments disclosed herein may be implemented with electronic hardware, or a combination of computer software and electronic hardware. Whether these functions are performed in hardware or software depends on the specific application and design constraints of the technical solution. Skilled artisans may implement the described functionality using different methods for each specific application, but such implementations should not be considered beyond the scope of the present application.

Those skilled in the art can clearly understand that for the convenience and simplicity of description, the specific working processes of the systems, devices, and units described above may be referred to the corresponding processes in the foregoing method embodiments, and will not be described again here.

The above are only specific embodiments of the present application, but the protection scope of the present application is not limited thereto. Any person familiar with the technical field can easily think of changes or substitutions within the technical scope disclosed in the present application, which should be covered by the protection scope of the present application. Therefore, the protection scope of the present application should be subject to the protection scope of the claims.

Obviously, numerous modifications and variations of the present invention are possible in light of the above teachings. It is therefore to be understood that within the scope of the appended claims, the invention may be practiced otherwise than as specifically described herein.

The invention claimed is:

1. A Sound Reference Signal (SRS) triggering method for antenna switching, wherein the method is performed by a network device, and the method comprises:

receiving capability report information sent by a terminal device, wherein the capability report information is used for indicating a combination of antenna switching configurations supported by the terminal device;

dynamically configuring uplink SRS resources for the terminal device according to the capability report information; and sending Downlink Control Information (DCI) to the terminal device, wherein the DCI is used for triggering an SRS resource set, and the SRS resource set corresponds to the antenna switching configuration, wherein the SRS resource set comprises at least one of:

the SRS resource set corresponding to the antenna switching configuration; or at least one SRS resource set for other usages, wherein the other usages are usages other than the antenna switching configuration, wherein sending Downlink Control Information (DCD) to the terminal device, where the DCI is used for triggering the SRS resource set, comprises one of the following:

sending Downlink Control Information (DCI) to the terminal device, wherein the DCI comprises a DCI field for the antenna switching configuration and other unused DCI fields, and bits in the DCI field and the other unused DCI fields jointly indicate a codepoint corresponding to the SRS resource set that needs to be triggered; or sending Downlink Control Information (DCI) to the terminal device, wherein the DCI comprises codepoints in a DCI field for the antenna switching configuration and other unused DCI fields, and the codepoints in the DCI field and the other unused DCI fields indicate all trigger codepoints; or sending extended DCI2-3 signaling to the terminal device, wherein the extended DCI2-3 signaling is used for indicating a trigger codepoint corresponding to a SRS triggering request field, and is further used for enhancing the SRS triggering for a group of terminal devices; or sending Group Common-Downlink Control Information (GC-DCI) to the terminal device, wherein the GC-DCI is used for indicating a trigger codepoint corresponding to a SRS triggering request field, and is further used for enhancing the SRS triggering for a group of terminal devices.

2. The method according to claim 1, wherein the DCI is used for triggering the SRS resource set corresponding to the antenna switching configuration, comprising:

the DCI comprises an extended aperiodic SRS request indication field, and the extended aperiodic SRS request indication field instructs the terminal device to trigger at least one SRS resource set.

3. The method according to claim 2, wherein the at least one SRS resource set comprises all or at least some of SRS resource sets corresponding to a specified antenna switching configuration.

4. The method according to claim 2, wherein the extended aperiodic SRS request indication field instructs the terminal device to trigger at least one SRS resource set, comprising:

the extended aperiodic SRS request indication field sets different SRS resource sets, aperiodic SRS resource trigger parameters corresponding to the different SRS resource sets are the same or different, and the triggering is made through a codepoint corresponding to an extended SRS resource trigger parameter.

5. The method according to claim 4, wherein the extended aperiodic SRS request indication field instructs the terminal device to trigger at least one SRS resource set, further comprising:

the extended aperiodic SRS request indication field sets the SRS resource set of the same antenna switching configuration, aperiodic SRS resource trigger parameters corresponding to the SRS resource set of the same antenna switching configuration are the same or different, and the triggering is made through a codepoint corresponding to an extended SRS resource trigger parameter.

6. The method according to claim 4, further comprising:

updating a respective trigger codepoint through a Media Access Control Control Element (MAC CE).

7. The method according to claim 1, wherein sending Downlink Control Information (DCI) to the terminal device, where the DCI is used to trigger the SRS resource set, comprises:

sending extended Downlink Control Information (DCI) to the terminal device, wherein the extended DCI comprises a redefined aperiodic SRS request indication field, the redefined aperiodic SRS request indication field is used for triggering the SRS resource set for at least one usage, and the at least one usage comprises the antenna switching configuration.

8. The method according to claim 7, wherein triggering the SRS resource set for at least one usage, where the at least one usage comprises the antenna switching configuration, comprises:

configuring a bitmap for activation, wherein the bitmap is composed of an identification ID corresponding to the SRS resource set for each usage in the at least one usage, and the bitmap comprises the identification ID of the SRS resource set corresponding to the antenna switching configuration; or configuring a codepoint for activation, wherein the codepoint is composed of an identification ID corresponding to the SRS resource set for each usage in the at least one usage, and the codepoint comprises the identification ID of the SRS resource set corresponding to the antenna switching configuration.

9. A sound reference signal SRS triggering method for antenna switching, wherein the method is performed by a terminal device, and the method comprises:

sending capability report information to a network device, wherein the capability report information is used for indicating a combination of antenna switching configurations supported by the terminal device; and receiving Downlink Control Information (DCI), wherein the DCI is sent by the network device after dynamically configuring uplink SRS resources for the terminal device according to the capability report information, the DCI is used for triggering an SRS resource set, and the SRS resource set corresponds to the antenna switching configuration, wherein the SRS resource set comprises the SRS resource set corresponding to the antenna switching configuration and at least one SRS resource set for other usages, wherein receiving Downlink Control Information (DCD), wherein the DCI is sent by the network device after dynamically configuring uplink SRS resources for the terminal device according to the capability report information, and the DCI is used for the SRS resource set, comprises:

receiving Downlink Control Information (DCI), wherein the DCI is sent by the network device after dynamically configuring uplink SRS resources for the terminal device according to the capability report information, the DCI comprises a DCI field for the antenna switching configuration and other unused DCI fields, and bits in the DCI field and the other unused DCI fields jointly indicate a codepoint corresponding to the SRS resource set that needs to be triggered; or receiving Downlink Control Information (DCI), wherein the DCI is sent by the network device after dynamically configuring uplink SRS resources for the terminal device according to the capability report information, the DCI comprises a DCI field for the antenna switching configuration and other unused DCI fields, and codepoints in the DCI field and the other unused DCI fields jointly indicate all trigger codepoints; or receiving extended DCI2-3 signaling, wherein the extended DCI2-3 signaling is sent by the network device after dynamically configuring uplink SRS resources for the terminal device according to the capability report information, and the extended DCI2-3 signaling is used for indicating a trigger codepoint corresponding to a SRS triggering request field, and is further used for enhancing the SRS triggering for a group of terminal devices; or receiving Group Common-Downlink Control Information (GC-DCI), wherein the GC-DCI is sent by the network device after dynamically configuring uplink SRS resources for the terminal device according to the capability report information, and the GC-DCI is used for indicating a trigger codepoint corresponding to a SRS triggering request field, and is further used for enhancing the SRS triggering for a group of terminal devices.

10. The method according to claim 9, wherein the DCI is used for triggering the SRS resource set, and the SRS resource set corresponds to the antenna switching configuration, comprising:

the DCI comprises an extended aperiodic SRS request indication field, and the extended aperiodic SRS request indication field instructs the terminal device to trigger at least one SRS resource set.

11. The method according to claim 9, wherein the at least one SRS resource set comprises an SRS set configuration corresponding to a specified antenna switching configuration; or the at least one SRS resource set comprises at least some of SRS resource sets corresponding to the specified antenna switching configuration.

12. The method according to claim 10, wherein the extended aperiodic SRS request indication field instructs the terminal device to trigger at least one SRS resource set:

the extended aperiodic SRS request indication field sets different SRS resource sets, aperiodic SRS resource trigger parameters corresponding to the different SRS resource sets are the same or different, and the triggering is made through a codepoint corresponding to an extended SRS resource trigger parameter; and the extended aperiodic SRS request indication field sets the SRS resource set of the same antenna switching configuration, aperiodic SRS resource trigger parameters corresponding to the SRS resource set of the same antenna switching configuration are the same or different, and the triggering is made through a codepoint corresponding to an extended SRS resource trigger parameter.

13. The method according to claim 9, wherein receiving Downlink Control Information (DCI), where the DCI is sent by the network device after dynamically configuring uplink SRS resources for the terminal device according to the capability report information, and the DCI is used for the SRS resource set, comprises:

receiving extended Downlink Control Information (DCI), wherein the extended DCI is sent by the network device after dynamically configuring uplink SRS resources for the terminal device according to the capability report information, the extended DCI comprises a redefined aperiodic SRS request indication field, the redefined aperiodic SRS request indication field is used for triggering the SRS resource set for at least one usage, and the at least one usage comprises the antenna switching configuration.

14. The method according to claim 13, wherein triggering the SRS resource set for at least one usage, where the at least one usage comprises the antenna switching configuration, comprises:

configuring a bitmap for activation, wherein the bitmap is composed of an identification ID corresponding to the SRS resource set for each usage in the at least one usage, and the bitmap comprises the identification ID of the SRS resource set corresponding to the antenna switching configuration; or configuring a codepoint for activation, wherein the codepoint is composed of an identification ID corresponding to the SRS resource set for each usage in the at least one usage, and the codepoint comprises the identification ID of the SRS resource set corresponding to the antenna switching configuration.

15. A communication device, comprising a processor and a memory, wherein a computer program is stored in the memory and the processor executes the computer program stored in the memory, so that the communication device performs the method according to claim 9.

16. A communication device, comprising a processor and a memory, wherein a computer program is stored in the memory and the processor executes the computer program stored in the memory, so that the communication device performs a Sound Reference Signal (SRS) triggering method for antenna switching, wherein the method comprises:

receiving capability report information sent by a terminal device, wherein the capability report information is used for indicating a combination of antenna switching configurations supported by the terminal device;

dynamically configuring uplink SRS resources for the terminal device according to the capability report information; and sending Downlink Control Information (DCI) to the terminal device, wherein the DCI is used for triggering an SRS resource set, and the SRS resource set corresponds to the antenna switching configuration, wherein the SRS resource set comprises at least one of:

the SRS resource set corresponding to the antenna switching configuration; or at least one SRS resource set for other usages, wherein the other usages are usages other than the antenna switching configuration, wherein sending Downlink Control Information (DCI) to the terminal device, where the DCI is used for triggering the SRS resource set, comprises one of the following:

sending Downlink Control Information (DCI) to the terminal device, wherein the DCI comprises a DCI field for the antenna switching configuration and other unused DCI fields, and bits in the DCI field and the other unused DCI fields jointly indicate a codepoint corresponding to the SRS resource set that needs to be triggered; or sending Downlink Control Information (DCI) to the terminal device, wherein the DCI comprises codepoints in a DCI field for the antenna switching configuration and other unused DCI fields, and the codepoints in the DCI field and the other unused DCI fields indicate all trigger codepoints; or sending extended DCI2-3 signaling to the terminal device, wherein the extended DCI2-3 signaling is used for indicating a trigger codepoint corresponding to a SRS triggering request field, and is further used for enhancing the SRS triggering for a group of terminal devices; or sending Group Common-Downlink Control Information (GC-DCI) to the terminal device, wherein the GC-DCI is used for indicating a trigger codepoint corresponding to a SRS triggering request field, and is further used for enhancing the SRS triggering for a group of terminal devices.

* * * * *